United States Patent
Jaeger

(10) Patent No.: US 9,036,334 B2
(45) Date of Patent: May 19, 2015

(54) OPERATING UNIT FOR INSTALLATION IN AN AIRCRAFT CABIN

(75) Inventor: Hartwig Jaeger, Jork (DE)

(73) Assignee: Airbus Operations GmbH, Hamburg (DE)

( * ) Notice: Subject to any disclaimer, the term of this patent is extended or adjusted under 35 U.S.C. 154(b) by 425 days.

(21) Appl. No.: 13/075,818

(22) Filed: Mar. 30, 2011

(65) Prior Publication Data

US 2011/0273849 A1 Nov. 10, 2011

Related U.S. Application Data

(60) Provisional application No. 61/318,894, filed on Mar. 30, 2010.

(30) Foreign Application Priority Data

Mar. 30, 2010 (DE) .......................... 10 2010 013 330

(51) Int. Cl.
| | |
|---|---|
| *B64D 11/04* | (2006.01) |
| *B60N 3/00* | (2006.01) |
| *A47B 31/06* | (2006.01) |

(52) U.S. Cl.
CPC ............... *B64D 11/04* (2013.01); *B60N 3/004* (2013.01); *B60N 3/001* (2013.01); *A47B 31/06* (2013.01)

(58) Field of Classification Search
CPC ........ B60N 3/001; B60N 3/004; A47B 31/06; G06F 1/1616; G06F 1/1618; G06F 1/162; G06F 1/1624

USPC .......... 108/44, 50.01, 50.02, 47; 297/188.06, 297/188.07, 188.04, 163; 361/679.01–679.45, 679.55–679.59

See application file for complete search history.

(56) References Cited

U.S. PATENT DOCUMENTS

| | | | |
|---|---|---|---|
| 4,913,487 A | 4/1990 | Breckel et al. | |
| 4,983,951 A * | 1/1991 | Igarashi et al. | ............... 340/461 |
| 5,207,471 A * | 5/1993 | Mutschler et al. | ......... 296/37.12 |
| 5,213,401 A * | 5/1993 | Hatcher | ..................... 312/208.1 |
| 6,082,692 A * | 7/2000 | Price | .......................... 248/278.1 |
| 6,646,863 B1 | 11/2003 | White et al. | |
| 7,399,033 B2 * | 7/2008 | Hsiao | .......................... 297/217.3 |
| 7,600,879 B1 * | 10/2009 | Reynolds | ...................... 359/881 |
| 7,762,627 B2 * | 7/2010 | Chang | .......................... 297/217.3 |
| 8,094,438 B2 * | 1/2012 | Dittmer et al. | ............ 361/679.01 |
| 2003/0042380 A1 * | 3/2003 | Hagglund et al. | ......... 248/286.1 |
| 2006/0075934 A1 * | 4/2006 | Ram | ............... 108/44 |

* cited by examiner

*Primary Examiner* — Nidhi Thaker
(74) *Attorney, Agent, or Firm* — Krieg DeVault LLP

(57) ABSTRACT

An operating unit (1) for installation in an aircraft cabin comprises an operating unit front side (10) and an operating unit rear side (20), at least one operating element (12, 14) attached in the region of the operating unit front side (10) and accessible to a user, and a holding device (40) for attaching the operating unit (1) to a monument (30) accommodating the operating unit (1) in its state mounted in the aircraft cabin. The holding device (40) is designed to attach the operating unit (1) in its state mounted in the aircraft cabin to the monument (30), in a first position or in a second position, as desired, the operating element (12, 14) in the second position of the operating unit (1) being situated in a spatial position which is lowered with respect to the spatial position of the operating element (12, 14) in the first position of the operating unit (1) and/or is displaced in a direction parallel to an imaginary straight line connecting the operating unit rear side (20) to the operating unit front side (10).

20 Claims, 4 Drawing Sheets

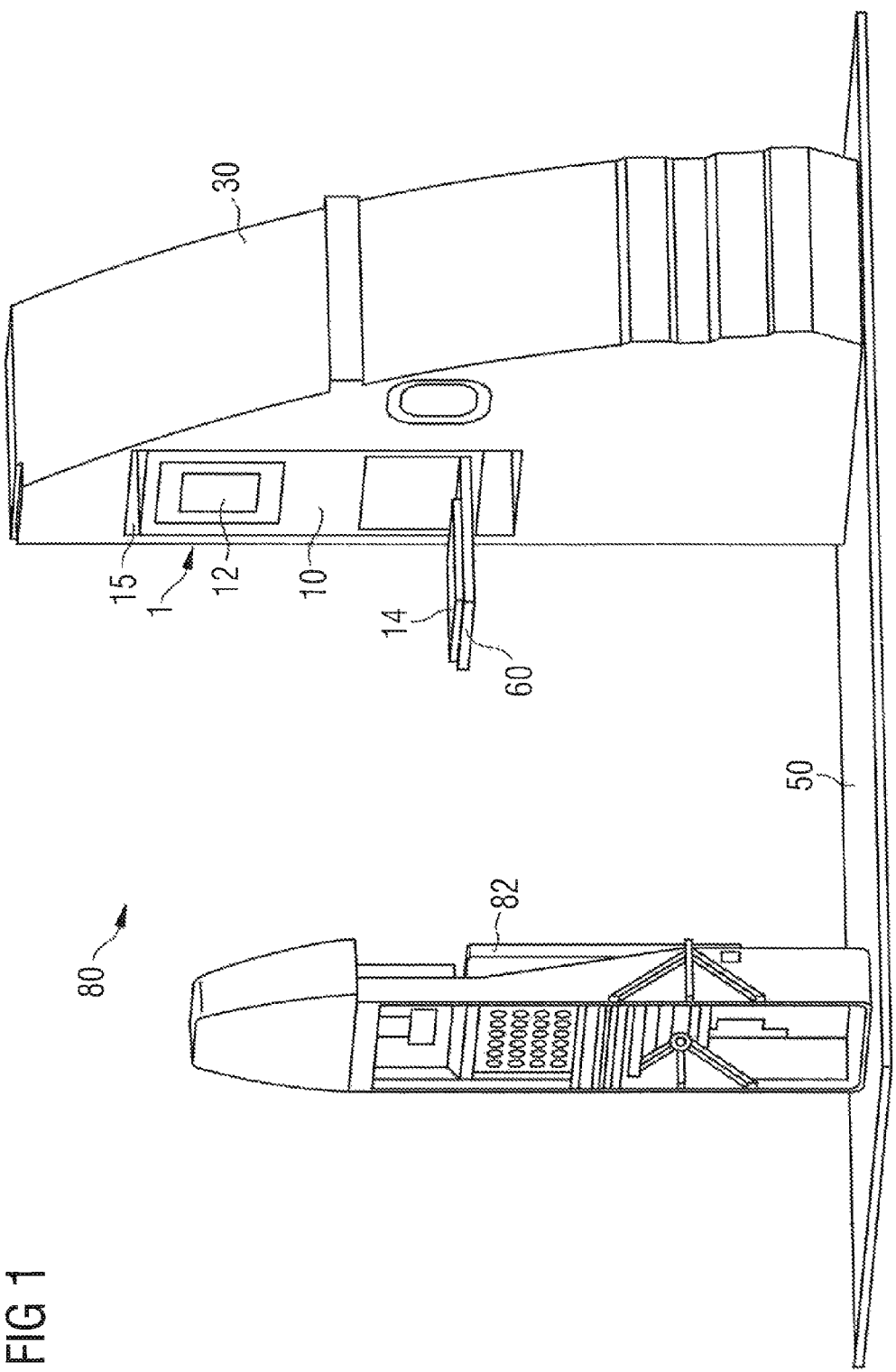

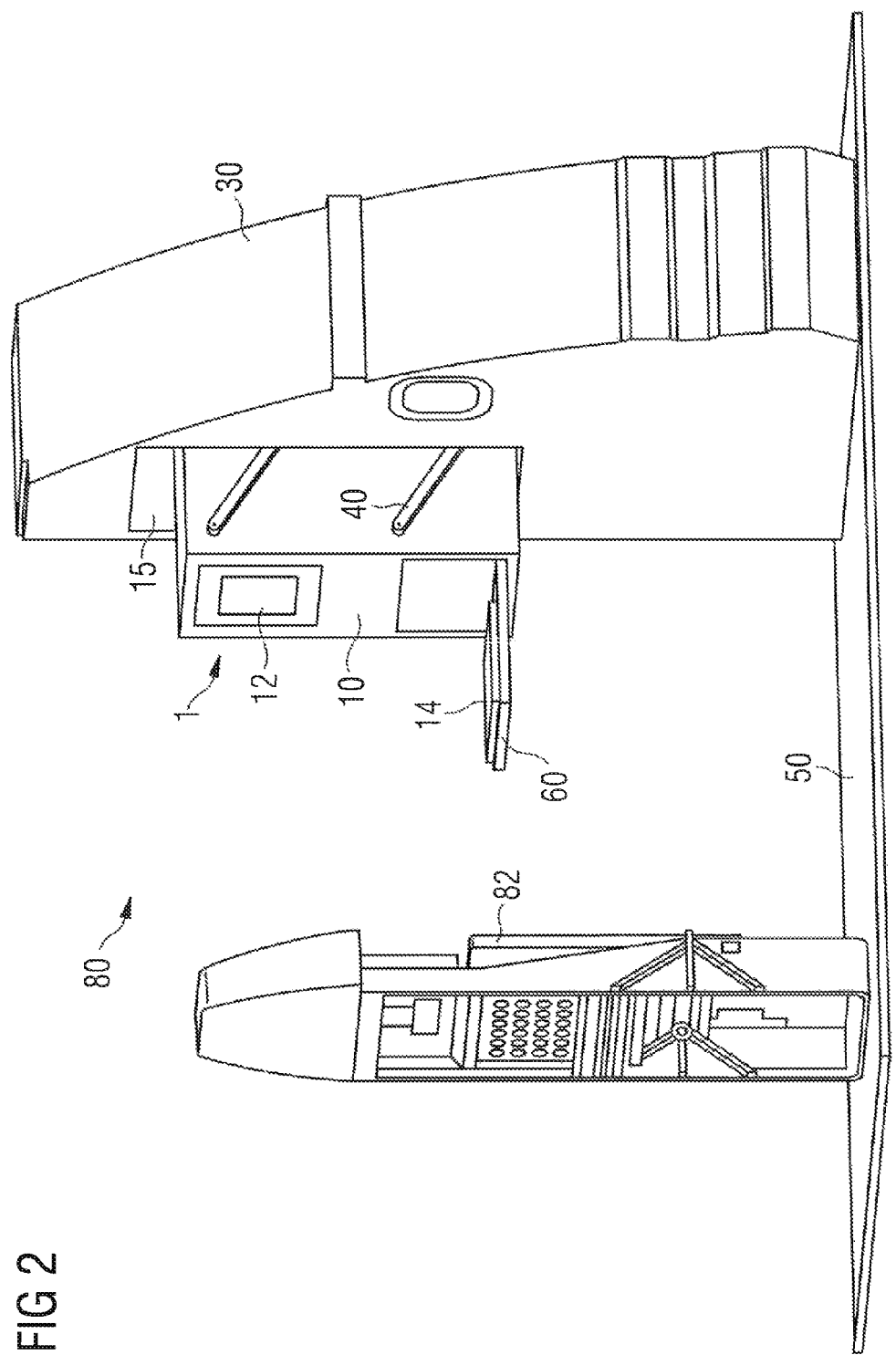

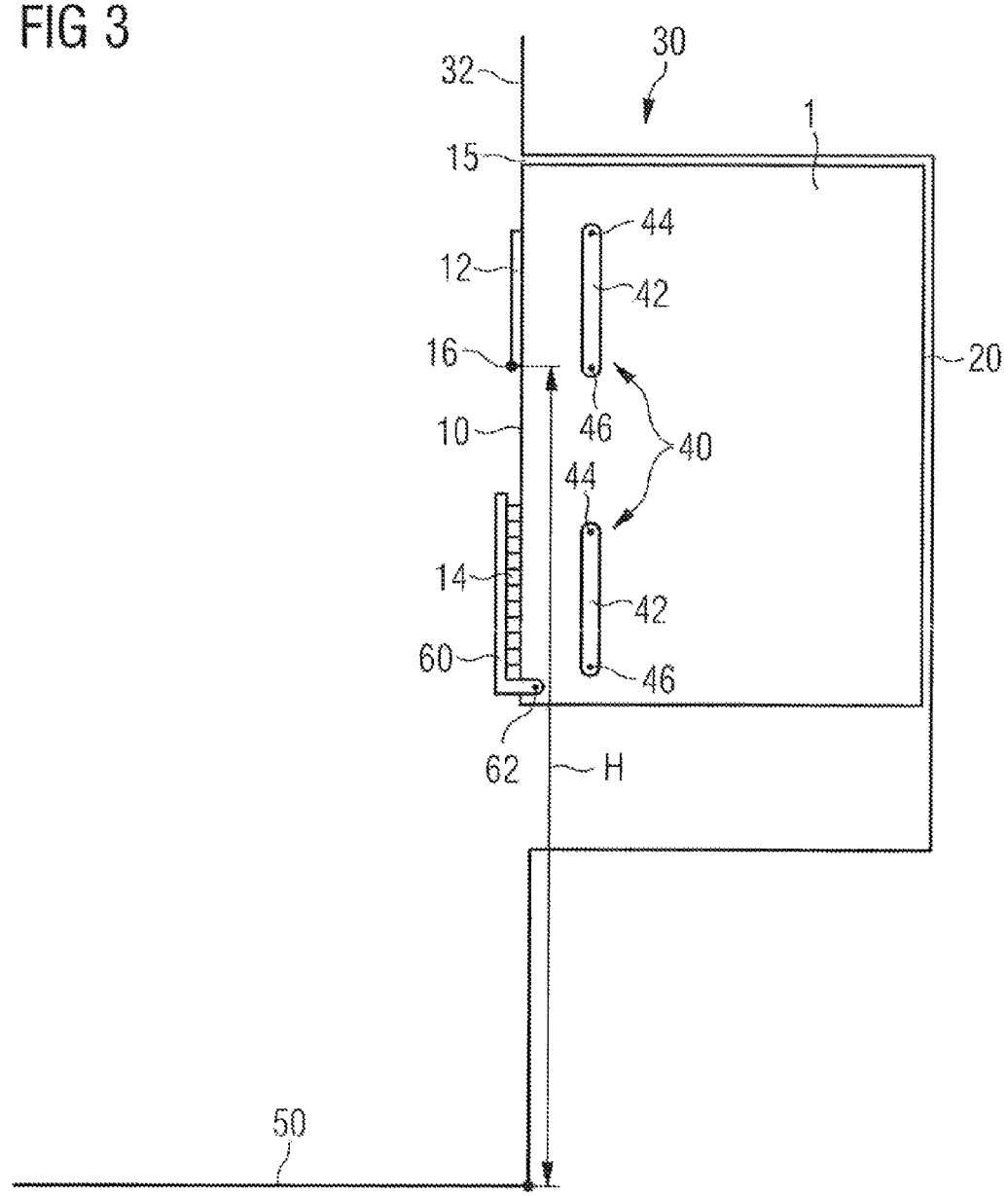

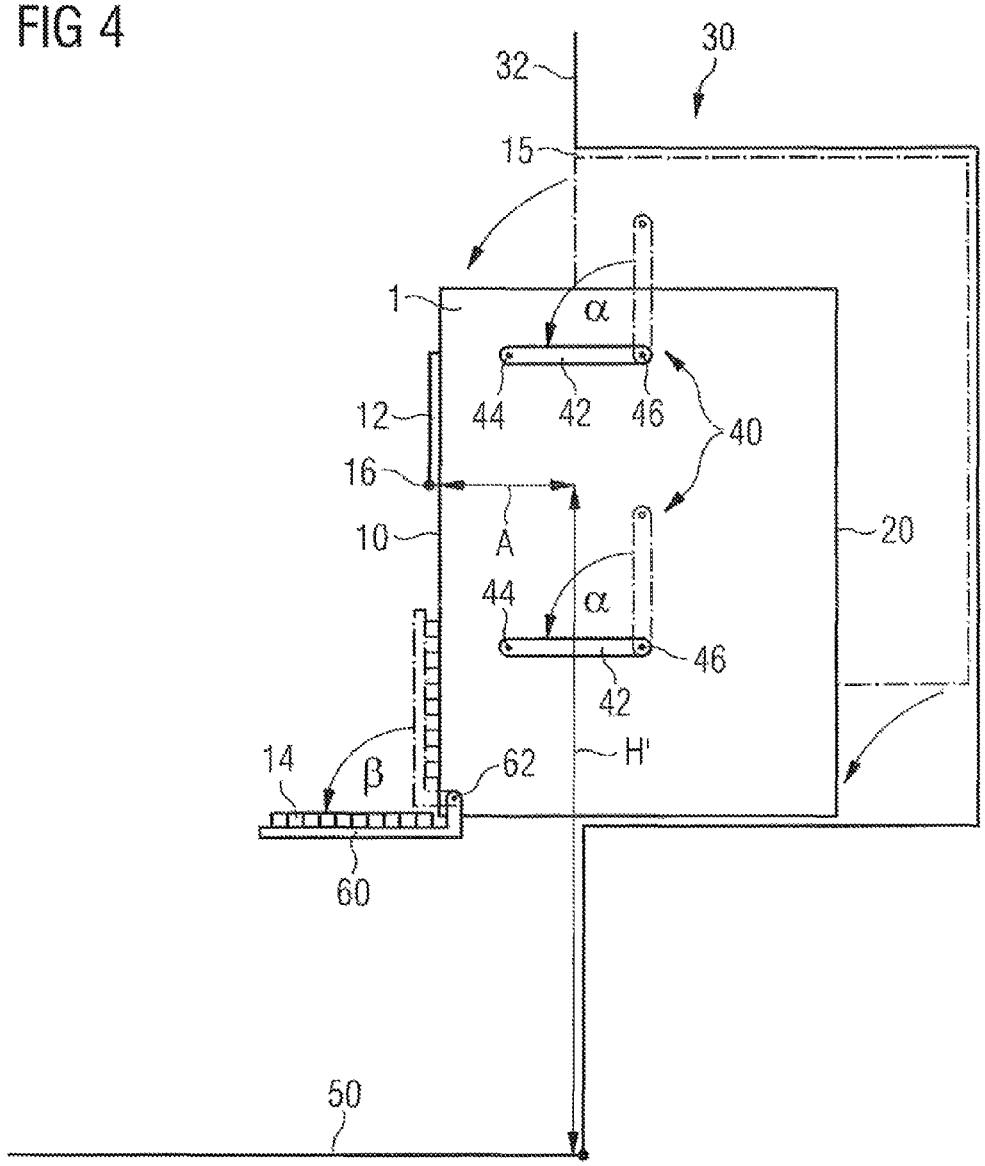

OPERATING UNIT FOR INSTALLATION IN AN AIRCRAFT CABIN

CROSS REFERENCE TO RELATED APPLICATIONS

The present application claims the benefit of U.S. Provisional Patent Application No. 61/318,894 filed Mar. 30, 2010 and to German Patent Application No. 10 2010 013 330.2 filed Mar. 30, 2010.

The present invention relates to an operating unit provided for installation in an aircraft cabin and to a workplace arrangement comprising such an operating unit and provided for installation in an aircraft cabin.

Particularly in aircraft used on long-distance flights, provision is normally made for at least one operating unit for controlling an entertainment system available on board the aircraft for the entertainment of the passengers, a so-called in-flight entertainment (IFE) system. The operating unit may be integrated into a monument installed in the aircraft cabin, such as, for example, an aircraft galley, and provided for operation when standing. Other known solutions are ones where the operating unit is formed as part of a workplace which comprises a table and a seat and is arranged in a separate aircraft cabin region optionally bounded by appropriate partition walls. Although an operating unit integrated into such a workplace is comfortable to operate when sitting, the workplace disadvantageously increases the weight of the aircraft and has a large installation volume.

The invention is directed at the object of providing an operating unit for installation in an aircraft cabin which is comfortable to operate and has a low weight and a small installation volume.

This object is achieved by an operating unit for installation in an aircraft having the features of claim 1.

An operating unit for installation in an aircraft cabin according to the invention comprises an operating unit front side and an operating unit rear side. The operating unit front side is accessible, preferably without obstruction, to a user in the normal operation of the operating unit and may be formed, for example, by a plane lateral surface of a cuboid-shaped operating unit. The operating unit front side may, however, also be formed by a non-planar surface, such as, for example, a curved surface, a section of a spherical surface, a section of a cylindrical surface or the like.

The operating unit rear side is preferably inaccessible to a user in the normal operation of the operating unit and may be formed, like the operating unit front side, by a plane surface but also by a surface curved in any desired manner.

The operating unit for installation in an aircraft cabin according to the invention further comprises at least one operating element attached, for example, in the region of the operating unit front side and accessible to a user in the normal operation of the operating unit. Further present is a holding device for attaching the operating unit to a monument accommodating the operating unit in its state mounted in the aircraft cabin. The holding device comprises, for example, one or more aluminium, carbon fibre and/or honeycomb-structure component(s) and may comprise in particular one or more bar linkages, profiles, strips, joints, hinges, guide rails and/or rolling bearings. The monument may be an aircraft interior fitting component, such as, for example, part of a galley, a partition wall or the like.

The holding device of the operating unit according to the invention is designed to attach the operating unit in its state mounted in the aircraft cabin to the monument, in a first position or in a second position, as desired, the operating element in the second position of the operating unit being situated in a spatial position which is lowered with respect to the spatial position of the operating element in the first position of the operating unit and/or is displaced in a direction parallel to an imaginary straight line connecting the operating unit rear side to the operating unit front side. Preferably, the holding device makes it possible to position the operating unit in a second position, in which the operating element assumes a spatial position which is both lowered with respect to the spatial position of the operating element in the first position of the operating unit and displaced forwards relative to a front side of a monument accommodating the operating unit in its state mounted in the aircraft cabin.

For example, in its first position, the operating unit may be accommodated in a space-saving manner substantially completely in a recess formed in the monument. A cabin region adjacent to the monument is then not reduced or narrowed by the operating unit, but is available as a passage, rest area, place for storage or the like. Furthermore, the operating unit is preferably positioned in its first position in such a manner that the operating unit can be comfortably operated when standing. In its second position, the operating unit may, in contrast, protrude at least partially from the recess formed in the monument. Furthermore, in its second position, the operating unit is preferably positioned in such a manner that the operating unit can be comfortably operated when sitting.

When the operating element in the second position of the operating unit assumes a spatial position which is lowered with respect to the spatial position of the operating element in the first position of the operating unit, the operating element in first position of the operating unit can be comfortably operated when standing and in the second position of the operating unit can likewise be comfortably operated when sitting. By displacement of the operating unit in a direction parallel to an imaginary straight line connecting the operating unit rear side to the operating unit front side, the operating element in the state of the operating unit mounted in the aircraft cabin can be positioned in different positions relative to the monument accommodating the operating unit, in particular relative to a front side of the monument. It is thereby possible to enable simpler accessibility of the operating element or operation of the operating element from a stationary seat arranged at a distance from the monument accommodating the operating unit in its state mounted in the aircraft cabin, for example a so-called cabin attendant seat. The operating unit according to the invention is distinguished by a high level of operating comfort, a low weight and a small installation volume.

The holding device of the operating unit according to the invention may furthermore be designed to attach the operating unit, in its state mounted in the aircraft cabin, in at least a third position to the monument accommodating the operating unit, the spatial position of the operating element in the third position of the operating unit differing both from the spatial position of the operating element in the first position of the operating unit and from the spatial position of the operating element in the second position of the operating unit.

The holding device preferably comprises a lever, the first end of which is pivotably fastened to the operating unit. For example, the first end of the lever may be pivotably articulated to a side wall of the operating unit. A second end of the lever is preferably pivotably fastenable to the monument accommodating the operating unit in its state mounted in the aircraft cabin. For example, the second end of the lever may be provided for pivotable fastening to a wall of the monument opposite the side wall of the operating unit, which wall bounds a recess accommodating the operating unit at least in the first position of the latter.

If desired or required, the holding device may additionally comprise a further lever, the first end of which is pivotably fastened to the operating unit and the second end of which is pivotably fastenable to the monument accommodating the operating unit in its state mounted in the aircraft cabin. The two levers of the holding device may then be pivotably articulated by their respective first ends to two mutually opposite side walls of the operating unit. The second ends of the levers may, in contrast, be provided for pivotable fastening to two mutually opposite walls of the monument which bound the recess accommodating the operating unit at least in the first position of the latter.

The operating unit according to the invention may further comprise a locking system which is designed to fix the operating unit in its first position and/or its second position. The locking system, which may comprise a plurality of locking devices as required, ensures that the operating unit can be fastened securely in its respective position and uncontrolled movement of the operating element is prevented.

In a preferred embodiment of the invention, the operating unit is designed to control an entertainment electronics system, that is to say an in-flight entertainment system of the aircraft.

The operating element may comprise, for example, a pushbutton, a sliding or rotary potentiometer, a rotary knob, a rotary control and/or sliding control, but also a more complex device, such as, for example, a monitor, a touch-sensitive monitor, a player, audio equipment, video equipment, a games console, a film or cinematic component, a communication system or a computer with or without associated accessories such as keyboard, mouse and/or printer. In general, the operating element may also comprise analogue and/or digital input and/or output devices.

In a preferred embodiment of the operating unit according to the invention, the operating unit comprises a folding device which is designed to accommodate a keyboard and is adjustable between a first folding position and a second folding position, as desired. In the first folding position, the keyboard preferably bears against the operating unit front side on the side of the keys. In the second folding position, the keyboard, in contrast, is preferably oriented substantially parallel to and, on the side of the keys, facing away from a floor of the aircraft cabin.

The folding device may comprise, for example, a joint, hinge and/or movement bearing which is fastened to the operating unit and allows the folding device to be folded down from the first folding position by a specific angle, for example 90°, into the second folding position. In the first position of the folding device, the keyboard preferably bears against the operating unit front side in such a manner that it is not possible to operate the keys of the keyboard, since the keys are situated between a keyboard rear side and the operating unit front side so as to be inaccessible for operation. In the second folding position, however, it is possible to operate the keys of the keyboard, since the keys become accessible to a user owing to the fact that the folding device is folded down from the first folding position into the second folding position. The holding device and the folding device of the operating unit according to the invention may be adjusted independently of one another.

A workplace arrangement for installation in an aircraft cabin according to the invention comprises an operating unit described above and a seat to be positioned opposite the operating unit. The seat of the workplace arrangement may be, for example, a, in particular foldable, cabin attendant seat.

A preferred embodiment of the invention will now be explained in more detail with reference to the attached schematic figures, in which:

FIG. 1 shows a three-dimensional illustration of an operating unit installed in an aircraft interior fitting component, the operating unit being situated in a first position, FIG. 2 shows a three-dimensional illustration of the operating unit installed in an aircraft interior fitting component, the operating unit being situated in a second position, FIG. 3 shows a cross-sectional illustration of the operating unit according to FIG. 1, and FIG. 4 shows a cross-sectional illustration of the operating unit according to FIG. 2.

An operating unit 1 illustrated in the figures in a state installed in an aircraft cabin comprises an operating unit front side 10 accessible to a user in the normal operation of the operating unit 1 and an operating unit rear side 20 inaccessible to the user in the normal operation of the operating unit 1. The operating unit is substantially cuboid-shaped. The operating unit front side 10 comprises three operating elements accessible to the user, a monitor 12, a printer (not illustrated) and a keyboard 14. The operating unit 1 is designed to control an entertainment electronics system of the aircraft.

The operating unit 1 further comprises a holding device 40 for attaching the operating unit 1 to an aircraft interior fitting component 30. The holding device 40 comprises two levers 42 made, for example, of aluminium (see FIGS. 3 and 4). A first end of the levers 42 is pivotably fastened to a side wall of the operating unit 1 at a first connection point 44. A second end of the lever 42, in contrast, is pivotably articulated to a wall of the aircraft interior fitting component 30 at a second connection point 46, which wall bounds a recess 15 formed in the aircraft interior fitting component 30 and accommodating the operating unit 1. A further pair of levers is fastened to a side wall (not visible) of the operating unit 1. The holding device 40 is designed to attach the operating unit 1 robustly and stably to the aircraft interior fitting component 30, in a first position (see FIGS. 1 and 3) or in a second position (see FIGS. 2 and 4) as desired.

In its first position, the operating unit 1 is accommodated in a space-saving manner completely in the recess 15 formed in the aircraft interior fitting component 30, so that the operating unit front side 10 terminates substantially flush with a front side 32 of the aircraft interior fitting component 30. In the first position of the operating unit 1, the operating elements 12, 14 are situated at a height which allows comfortable operation of the operating elements 12, 14 when standing. For example, a specific point 16 of an operating element 12, 14 attached to the operating unit front side 10 is situated at a distance H above an aircraft cabin floor 50, see FIG. 3.

In its second position, the operating unit 1, in contrast, protrudes partially from the recess 15 formed in the aircraft interior fitting component 30. For example, in the second position of the operating unit 1, the point 16 is displaced by a distance A with respect to its position in the first position of the operating unit 1 along the direction of the surface normal of the operating unit front side 10. Furthermore, in the second position of the operating unit 1, the operating elements 12, 14 attached to the operating unit front side 10 are arranged lower, i.e. closer to the aircraft cabin floor 50, with respect to the first position of the operating unit 1. For example, in the second position of the operating unit 1, the point 16 is situated at a distance H' above the aircraft cabin floor 50, the distance H' being shorter than the distance H, see FIGS. 3 and 4. In its second position, the operating unit 1 is positioned in such a manner that the operating elements 12, 14 can be comfortably operated when sitting.

If the first position of the operating unit 1 is compared with the second position of the operating unit 1, the orientation of the levers 42 of the holding device 40 in the first position of the operating unit 1 encloses an angle a with the orientation of the levers 42 in the second position of the operating unit 1. For example, the angle a is 90°. The movement of the first connection point 44 describes a movement of the operating unit 1 from the first position into its second position, thus a quarter circle.

The operating unit 1 further comprises a locking system (not illustrated specifically in the figures) which is designed to fix the operating unit 1 in its first position and in its second position. Uncontrolled alteration of the position of the holding device 40 and thus of the spatial position and/or the orientation of the operating unit 1 is thus prevented.

The operating unit 1 further comprises a folding device 60 which is designed to accommodate the keyboard 14. The folding device 60 is connected to the operating unit 1 via at least one folding device connection 62. The folding device 60 is adjustable between a first folding position and a second folding position. In the first folding position of the folding device 60, the keyboard 14 bears against the operating unit front side 10 on the side of the keys. In the second folding position of the folding device 60, the keyboard 14, in contrast, is accessible to a user and operable by a user. Upon a movement of the folding device 60 from its first folding position into its second folding position, the folding device 60 and the keyboard accommodated on the folding device 60 are pivoted by an angle β. In the embodiment shown, the angle β is 90°.

A workplace arrangement 80 comprising the operating unit 1 (see FIGS. 1 and 2) further comprises a foldable cabin attendant seat 82 which is positioned opposite the operating unit 1. When the operating unit 1 is situated in its first position, as shown in FIGS. 1 and 3, the operating elements 12, 14 can be comfortably operated when standing. For this purpose, all that is required is to move the folding device 60, with the keyboard 14 accommodated on the folding device 60, from its first folding position into its second folding position. When the operating unit 1 is situated, in contrast, in its second position, as shown in FIGS. 2 and 4, the operating elements 12, 14 can be comfortably operated from the cabin attendant seat 82 when sitting.

The invention claimed is:

1. An operating unit for installation in an aircraft cabin, comprising:
    an operating unit front side, an operating unit rear side, and a first side wall extending between the operating unit front side and the operating unit rear side,
    at least one operating element attached in the region of the operating unit front side and accessible to a user, and
    a holding device for attaching the operating unit to a monument accommodating the operating unit in a state mounted in the aircraft cabin, wherein the holding device comprises a first lever and a second lever, a first portion of each of the first and second levers being directly and pivotably fastened to the first side wall of the operating unit and a second portion of each of the first and second levers being directly and pivotably fastenable to an opposing wall of the monument accommodating the operating unit in the state mounted in the aircraft cabin with the opposing wall of the monument being directly opposite and facing the first side wall of the operating unit, wherein the first and second levers are designed to attach the operating unit in its state mounted in the aircraft cabin to the monument, displaceable between a first position and in a second position, wherein the operating unit upon a movement from the first position to the second position is displaceable with respect to the monument perpendicularly to an imaginary straight line connecting the operating unit rear side to the operating unit front side such that the operating element in the second position of the operating unit being situated in a spatial position which is lowered with respect to the spatial position of the operating element in the first position of the operating unit.

2. The operating unit according to claim 1, characterised in that the first end of each of the first and second levers is pivotably fastened to the side wall of the operating unit and the second end of each of the first and second levers is pivotably fastenable to the opposing wall of the monument accommodating the operating unit in its state mounted in the aircraft cabin.

3. The operating unit according to claim 1, characterised in that the operating unit comprises a locking system which is designed to fix the operating unit in its first position and/or its second position.

4. The operating unit according to claim 1, characterised in that the operating unit is designed to control an entertainment electronics system of the aircraft.

5. The operating unit according to claim 1, characterised in that the operating unit comprises a monitor, a printer and/or a keyboard.

6. The operating unit according to claim 5, characterised in that the operating unit comprises a folding device which is designed to accommodate the keyboard and is adjustable between a first folding position and a second folding position, as desired, the keyboard, in the state of the operating unit mounted in the aircraft cabin, bearing in the first folding position against the operating unit front side on the side of the keys and being oriented in the second folding position substantially parallel to and, on the side of the keys, facing away from a floor of the aircraft cabin.

7. A workplace arrangement for installation in an aircraft cabin, comprising:
    an operating unit according to claim 1 and
    a seat to be positioned opposite the operating unit.

8. The workplace arrangement according to claim 7, characterised in that the seat of the workplace arrangement comprises a foldable, cabin attendant seat.

9. The operating unit according to claim 1, characterised in that the operating unit upon the movement from the first position to the second position is displaceable with respect to the monument parallel to the imaginary straight line connecting the operating unit rear side to the operating unit front side such that the operating element in the second position of the operating unit is situated in a spatial position which is displaced with respect to the spatial position of the operating element in the first position of the operating unit in a direction parallel to the imaginary straight line connecting the operating unit rear side to the operating unit front side.

10. The operating unit according to claim 9, characterised in that the holding device includes a linkage comprising the first and second levers and structured to provide concurrent perpendicular and parallel displacement.

11. The operating unit according to claim 10, characterised in that the linkage includes first pivot points fixed to the operating unit and second pivot points fixed to the monument, the operating unit displaceable perpendicularly to the imaginary line at the same time that the linkage is rotating about the first and second pivot points.

12. The operating unit according to claim 11, characterised in that the first pivot point is at a first end of the lever and the second pivot point is at a second end of the lever.

13. The operating unit according to claim 1, characterised in that a front face of the operating unit maintains the same orientation in the first position and second position.

14. The operating unit according to claim 1, wherein the first and second levers are designed to displace the operating unit between the first and second positions without rotation of the operating unit relative to the monument.

15. A workplace arrangement for installation in an aircraft cabin, comprising: an aircraft interior fitting component adapted to be mounted in an aircraft cabin, the aircraft interior fitting component including a wall bounding a recess; an operating unit accommodated in the recess of the aircraft interior fitting component, the operating unit comprising a front side, a rear side, and a side wall, the side wall extending between the front side and the rear side, an operating element disposed in the region of the front side and accessible to a user, and the rear side being inaccessible to the user within the recess; a holding device that attaches the operating unit to the aircraft interior fitting component to be movable between a first position accommodated within the recess and a second position extended outwardly from the recess and downwardly from the first position, wherein the holding device comprises a linkage that is connected to the side wall of the operating unit and to the wall bounding the recess and is configured to displace the operating unit between the first position and the second position with respect to the aircraft interior fitting component perpendicularly to an imaginary straight line connecting the operating unit rear side to the operating unit front side; and wherein the holding device comprises a first lever and a second lever, wherein each of the first and second levers has a first portion directly and pivotably connected to the side wall of the operating unit and a second portion directly and pivotably connected to a portion of the wall bounding the recess of the aircraft interior fitting component that is directly opposite and facing the side wall of the operating unit.

16. The workplace arrangement of claim 15, wherein the first portions comprise first ends of the levers and the second portions comprise second ends of the levers.

17. The workplace arrangement of claim 15, further comprising:
a seat positioned opposite the front side of the operating unit.

18. The workplace arrangement of claim 15, wherein the operating unit further comprises:
a folding device designed to accommodate a keyboard, the folding device being pivotably adjustable, as desired, between a first folding position bearing against the front side of the operating unit and a second folding position being oriented substantially parallel to a floor of the aircraft cabin.

19. An apparatus comprising: an aircraft having a cabin; an interior fitting component having a front face located in the cabin; a recess formed through the front face of the interior fitting component, the recess defined by opposing top and bottom walls, opposing side walls and a rear wall; an operating unit movable between first and second positions and having at least one electronic component associated therewith, the operating unit having front and rear walls, opposing side walls and a top and bottom wall; in the first position, the operating unit is positioned within the recess such that the front wall is substantially flush with the front face of the interior fitting component and the bottom wall of the operating unit is spaced above the bottom wall of the recess at a predefined distance; and in the second position, the operating unit is positioned at least partially out of the recess such that the front wall of the operating unit is forward of the front face of the interior fitting component and the bottom wall of the operating unit is spaced above the bottom wall of the recess at a lesser distance than the predefined distance of the first position; and first and second levers directly and pivotably connected to both a sidewall of the operating unit and a corresponding sidewall of the recess, the first and second levers operable to permit movement of the operating unit between the first and second positions without a change of angular orientation of the front wall with respect to the interior fitting component.

20. The apparatus of claim 19, further comprising a keyboard pivotably connected to the operating unit such that the keyboard is moveable between a substantially parallel orientation and a substantially perpendicular orientation with respect to the front wall of the operating unit.

* * * * *